INVENTORS
James W. Jacobs
Richard E. Gould.
BY
R. R. Candor.
Their Attorney.

Jan. 29, 1957    J. W. JACOBS ET AL    2,779,168
REFRIGERATING APPARATUS
Filed Sept. 8, 1955    5 Sheets-Sheet 3

INVENTORS
James W. Jacobs
BY Richard E. Gould
R. R. Candor.
Their Attorney.

Jan. 29, 1957   J. W. JACOBS ET AL   2,779,168
REFRIGERATING APPARATUS
Filed Sept. 8, 1955   5 Sheets-Sheet 5

INVENTORS
James W. Jacobs
Richard E. Gould
BY
R. R. Candor.
Their Attorney.

United States Patent Office 2,779,168
Patented Jan. 29, 1957

---

2,779,168

REFRIGERATING APPARATUS

James W. Jacobs and Richard E. Gould, Dayton, Ohio, assignors to General Motors Corporation, Detroit, Mich., a corporation of Delaware Application September 8, 1955, Serial No. 533,083

8 Claims. (Cl. 62—116)

This invention relates to refrigeration and more particularly to the fabrication of two or more elements of a refrigerating system into a single unit by a roll-forging method.

In the George R. Long Patent 2,662,273, dated December 15, 1953, and the Clifford H. Wurtz et al. Patent 2,712,736, dated July 12, 1955, there is disclosed methods of making sheet metal evaporators for refrigerating systems by a roll forging process. The method briefly consists of superimposing metal plates one upon another with a stop-weld material applied to the face of one of the plates in a predetermined pattern. The superimposed plates are roll-forged together by passing them between a pair of heated pressure rollers where their thickness is reduced and their contacting surfaces at all points except where the plates have been precoated by the stop-weld material are forged together. After roll-forging the plates together the internal passages between the composite or one-piece plate member are dilated by subjecting the same to a fluid pressure while the composite member is confined between two blocks or heavy plates in the manner fully explained in the Long patent. When the composite member comes out between the rollers and while it is being dilated it is in a flat form and is usually thereafter bent into a box-like or U-shaped evaporator and provides walls of a freezing compartment. The method of making sheet metal evaporators for refrigerating systems as disclosed in the aforesaid Long and Wurtz et al. patents has substantially revolutionized the refrigeration industry by providing various advantages and manufacturing efficiencies. We purpose the use of this roll forging technique for producing further advantages and for reducing the cost of manufacturing units of closed refrigeration system. We contemplate the provision of a roll-forged member having in addition to flat side walled passages therein a passage of substantial capillary size and of a predetermined length whereby a single unit forms several elements of a refrigerating system which have heretofore been individually manufactured and connected together in closed circuit relationship by conduit or pipes separate or independent of the element. We modify a portion of or step in the method disclosed in the Long and Wurtz et al. patents to the extent of providing interchangeable insets in a fixture employed for confining the roll forged member during the dilation of passages therein whereby an insert in the fixture confines a passage length in the member to a greater degree than confinement of other passages therein so as to simultaneously form a refrigerant restrictor passage and a plurality of larger unobstructed passages in the member. We make the fixture large enough as to be capable of receiving roll forged members of various sizes and utilize the interchangeable inserts in the fixture for forming a substantially capillary passage in the various sized roll-forged members of different lengths in accordance with the capacity of the combined unit having larger passages dilated therein. This is important from a manufacturer's standpoint because a full or complete line of units can be made by a single confining fixture to thus eliminate the necessity of building separate fixtures for receiving the differently sized members to be dilated. In other words, our invention permits the dilation of passages in roll-forged members of a size to take care of the refrigeration requirement of the smallest to the largest refrigerators in a single fixture. By providing the interchangeable inserts for the single fixture we eliminate retooling costs in making a plurality of fixtures of different shape or form for confining different sized rolled forged members during dilation of passages therein and thereby greatly reduce manufacturing costs in producing the finished combined unit herein disclosed.

An object of our invention is to make it possible to form a plurality of heat exchanger elements of a refrigerating system as a single or combined unit from a roll-forged member.

Another object of our invention is to form refrigerated passages of different cross sectional area or size in a roll-forged member whereby the member serves to provide a combined unit with two or more elements of refrigerating system therein.

Another object of our invention is to provide a refrigerant pressure reducer or restrictor in a roll-forged one piece member which may be formed simultaneously with the forming of larger refrigerant passages therein.

Still another object of our invention is to provide a roll-forged sheet metal member or unitary structure having several elements of refrigerating system integrally formed therein with refrigerant passages thereof connected together in the member whereby separate lengths of conduit or pipes normally connecting elements of a refrigerating system in closed circuit relationship are eliminated.

A further object or our invention is to provide inlet and outlet openings in refrigerant passages of a plurality of elements of a refrigerating system formed in a roll-forged member or unit at a concentrated point thereon and to mechanically clamp the member in the vicinity of this point to a juncture-like boss on a sealed motor-compressor casing for directly conveying refrigerant into and out of various portions of the unit to and from elements in the member to eliminate the physical bonding or securing of pipes or conduits between the member and the unit.

A still further and more specific object of our invention is to produce a series of passages in roll-forged member so as to provide a refrigerant evaporator, a refrigerant condenser, a refrigerant receiver, a restrictor and superheat removing conduits of a refrigerating system therein, to shape the evaporator portion of the member so as to be receivable in a refrigerator cabinet for forming walls of a freezing compartment therein and to shape the remainder of the member, containing the condenser, restrictor, receiver and superheat removing conduits of the system, to provide an air flue along the back wall of the refrigerator cabinet.

Further objects and advantages of the present invention will be apparent from the following description, reference being had to the accompanying drawings wherein a preferred form of the invention is clearly shown.

Figures 1, 2:
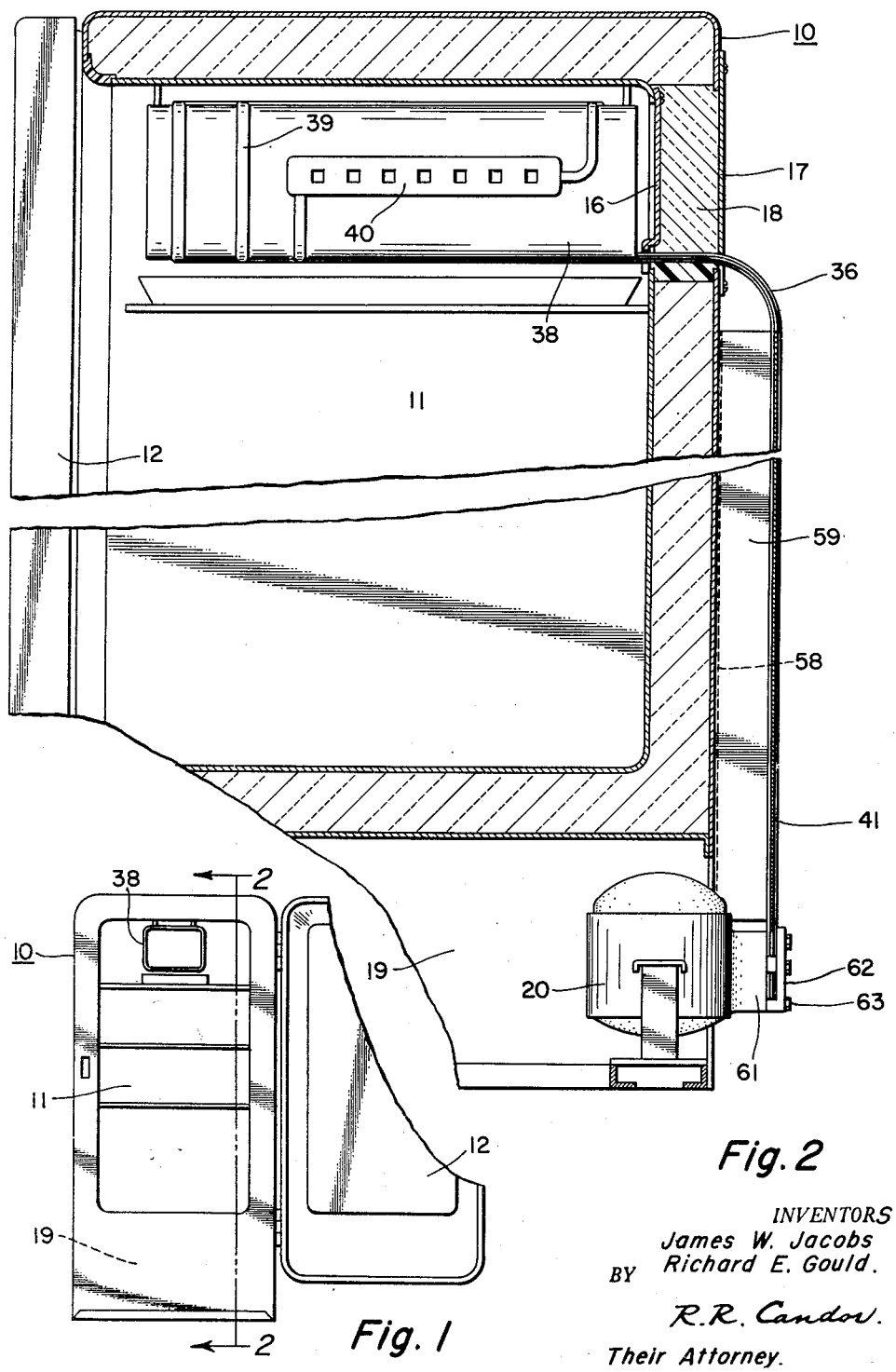
Figure 1 is a front view of a refrigerator having a roll-forged member constructed according to the present invention associated therewith.
Figure 2 is an enlarged fragmentary vertical sectional view taken on the line 2—2 of Figure 1 showing the mounting of different integral portions of our combined unit upon or within the refrigerator.

Referring to the drawings, for illustrating our invention, there is shown in Figure 1 thereof a refrigerating apparatus including a refrigerator cabinet 10 having a plurality of insulated walls forming a food storage chamber 11 therein provided with the usual food supporting shelves. Chamber 11 has an access opening normally closed by a door 12. A sheet metal refrigerant evaporator portion of a two-portioned roll-forged member of a refrigerating system associated with cabinet 10 and to be hereinafter described is located in the upper part of chamber 11. This evaporator forms walls of a freezing compartment in chamber 11 and is preferably provided with a front door (not shown). The evaporator is adapted to chill air and causes its circulation throughout the interior of chamber 11 for cooling food products stored therein. The rear insulated wall of cabinet 10 has an opening therein closed by removable inner and outer panels 16 and 17 respectively with loose or bulk insulating material 18 disposed therebetween (see Figure 2) for a purpose to become apparent hereinafter. Cabinet 10 is provided with a machine compartment 19 below the food storage chamber 11.

Figure 4:
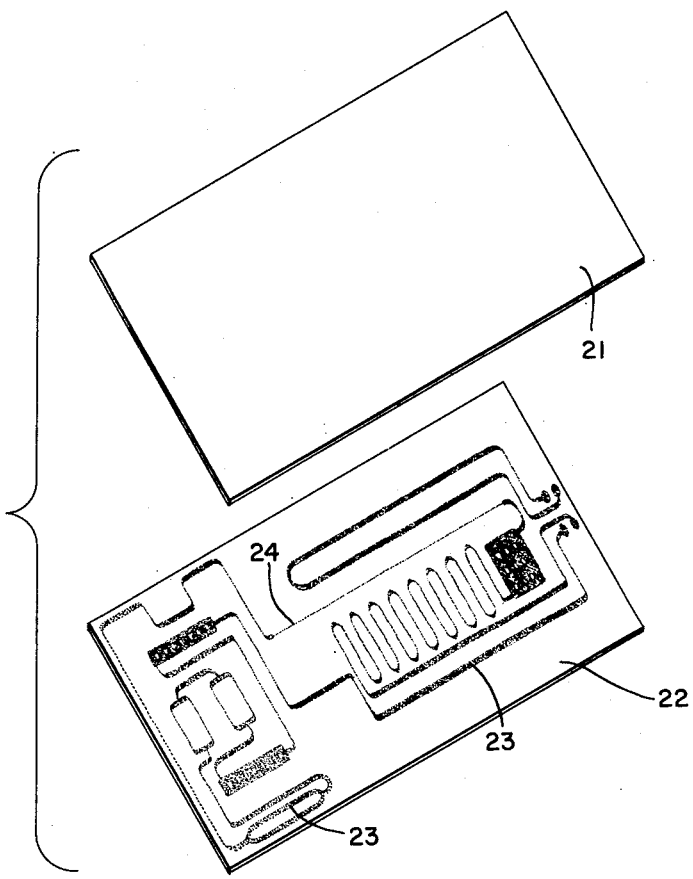
Figure 4 is a perspective view showing metal sheets used in the manufacture of the combined unit of the present invention with a pattern of stop-weld material on one of the sheets.

The refrigerating system associated with cabinet 10 in the present disclosure comprises a sealed casing 20, containing an electric motor and compressor (not shown) and a roll-forged member having refrigerant passages therein arranged as will be presently described. The casing 20 is mounted in the machine compartment 19 of cabinet 10. In order to provide the various passages in the roll-forged member forming a part of the present refrigerating system and made substantially in accordance with the roll-forged method described in the patents heretofore referred to we show in Figure 4 of the drawings a pair of metal plates 21 and 22. One of these aluminum alloy plates has a predetermined design of stop-weld material 23 applied thereto or coated thereon by a stencil. This stop weld material may consist of a liquid suspension of colloidal graphite, ground oyster shells and sodium silicate. The two plates 21 and 22 are superimposed one upon the other and passed between a pair of heated pressure rollers to apply a roll-forging operation thereto as fully described in the Long patent. The thickness of the plates is reduced and they are forged together at their contacting surfaces at all points except where the plates have been precoated by the stop-weld material 23 to provide a composite member. The roll-forging operation greatly elongates the plates or sheets 21 and 22 but does not materially widen them so the pattern of the stop-weld material 23 applied to the one sheet must be foreshortened accordingly as shown in Figure 4. After the roll-forging operation has been completed the composite flat plate member is placed between two blocks or heavy plates having flat surfaces throughout most of their working faces. Our disclosure is here somewhat modified over that of the two patents referred to for the purpose of providing, without the aid of additional means, a refrigerant restrictor within the composite one-piece roll-forged member. Referring again to Figure 4 it will be noted that the design of the stop-weld material 23 on the one plate includes a very fine or narrow elongated line 24 of this material which forms, when the roll-forged member is dilated, a passage therein of a different size than all other passages provided in the same. The passage formed by the fine line 24 of stop-weld material is to be substantially capillary in size as compared to other larger flat side walled passages formed in the member. It is to be appreciated that the fine line of stop-weld material 24 must be unbroken and with a little effort and carefulness on the part of a workman applying the material along this line the passage in the roll-forged member to be obtained therefrom can be continuous for the purpose herein disclosed.

Figure 10:
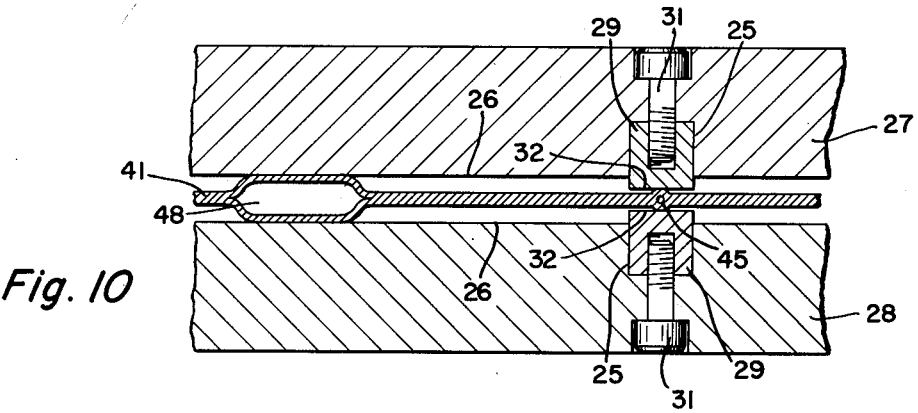
Figure 10 is a fragmentary sectional view through a portion of the roll-forged member showing an insert projecting beyond flat surfaces of heavy backing plates of a fixture employed to limit the dilation of passages in the member to provide passages of different areas therein.
Figure 11:
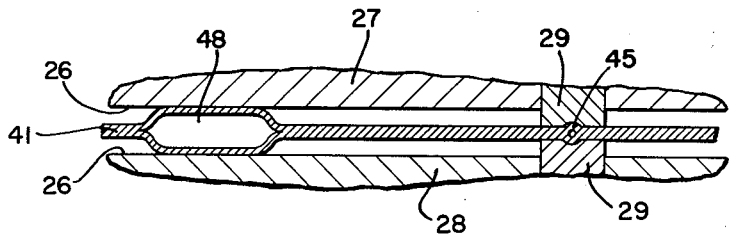
Figure 11 is a fragmentary sectional view similar to Figure 10 showing another method of forming a refrigerant restricting means in the composite roll-forged member during dilation of passages therein.
Figures 8, 9:
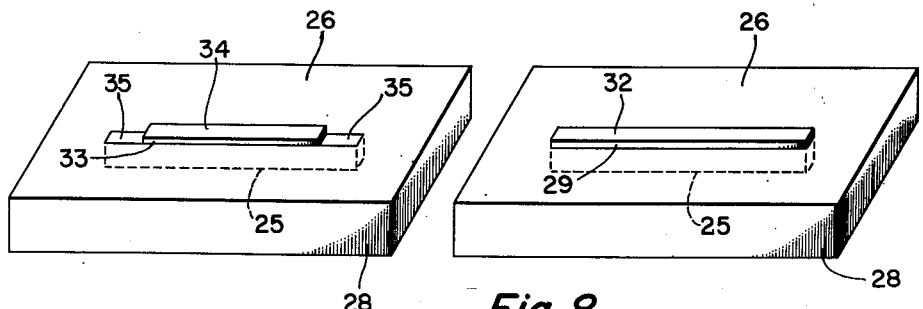
Figure 8 is a perspective view of a block or heavy plate of a two-plate fixture employed for confining a roll-forged member during dilation of passages therein and showing an insert in the block or plate.
Figure 9 is a view similar to Figure 8 showing a different insert in the block or plate of the fixture.

By reference to Figures 8, 9 and 10 of the drawings it will be noted that we cut or provide a recess 25 in the flat surface 26 of each of the blocks or heavy plates 27 and 28 and fill the recess 25 with an insert 29 held in place therein by bolts or the like 31 (see Figure 10). In order to insure complete confinement of walls of a roll-forged member during dilation of a capillary passage therein each insert 29 may have a groove cut lengthwise in its face as shown in Figure 11 of the drawings. Each insert 29 has its flat face 32 disposed beyond or spaced a predetermined distance from the flat surface 26 of each block 27 and 28. Insert 29 shown in Figure 8 has its flat face surface 32 coextensive with the recess 25 in the blocks 27 and 28. This is for the purpose of confining walls of a passage along the stop-weld line 24 in the largest of a roll-forged member, to be made in accordance with our invention and to be associated with a big refrigerator, throughout a predetermined length thereof. When a smaller roll-forged member for a refrigerator cabinet of less food storage capacity is to be made the inserts 29 are removed from the blocks or plates 27 and 28 and are replaced by interchangeable inserts 33 shown in Figure 9 of the drawings. Inserts 33 have a shorter flat working surface 34 projecting beyond the face 26 and have thinner end portions provided with flat surfaces 35 disposed flush with the face 26 of the blocks or plates 27 and 28. Thus the surfaces 35 of inserts 33 form a continuation of and do not obstruct the flat working faces 26 of the confining blocks so that flat side walled passages may be formed in the smaller members up close to the restricting passage therein if desired. In this manner restrictors of different length according to various sized roll-forged members to be located between the blocks or plates 27 and 28 can be formed in the members. After the aluminum sheets or plates 21 and 22 have been roll-forged together to provide the composite member the internal passages therein, afforded by the stop-weld material 23 and 24, are dilated by subjecting them to a fluid pressure. The roll-forged member is placed between the two blocks or heavy plates 27 or 28 and the fluid pressure is applied to the passages therein. The face surface 32 or 34 of the insert 29 or 33 respectively straddles the length of the fine line stop-weld material 24 and by virtue of the flat surfaces 32 and 34 on these interchangeable inserts being raised with respect to the flat surfaces 26 of blocks 27 and 28 walls of the passages at opposite sides of the stop-weld line 24 in the roll-forged member cannot bulge or expand outwardly as far as the walls of all the other passages therein (see Figure 10). Consequently flat sided passages and a restrictor passage or duct of predetermined length and approximately .031 inch inside diameter is provided in the roll-forged member. When the dilated composite roll-forged member is removed from the restraining blocks 27 and 28 it is in flat form and is trimmed or cut and drilled, as shown in Figure 5, and readied to be bent into a particular shape.

Figure 3:
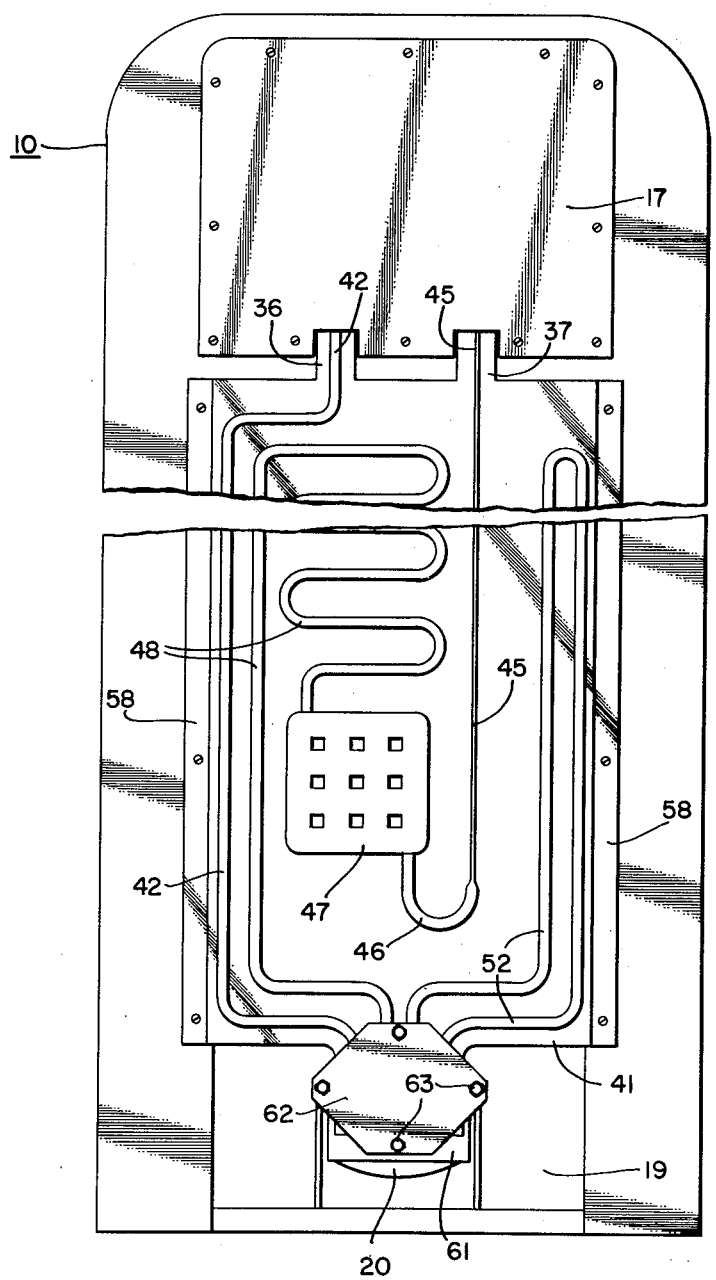
Figure 3 is a rear view of the refrigerator disclosed in Figures 1 and 2.
Figure 5:
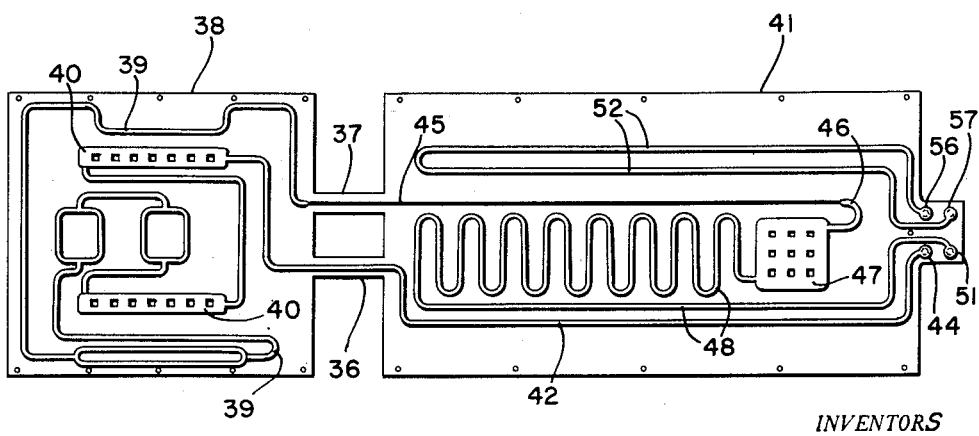
Figure 5 is a plan view of the present roll-forged member after passages therein have been dilated and showing the member trimmed and ready to be bent.

Referring now to Figure 5 it will be noted that the pattern of the stop-weld material 23 applied to the one plate of the roll-forged member provides same with tortuous refrigerant passages. Trimmed as shown in Figure 5 the roll-forged member is in reality in two integral portions connected by the legs or webs 36 and 37. The first or upper portion 38 of the roll-forged member has the passages therein providing refrigerant expansion ducts 39 and refrigerant accumulators 40. This portion of the member is bent to form walls of a freezing compartment and is adapted to be moved into cabinet 10 through the opening in its rear wall so as to locate the freezing compartment in the upper part of the food storage chamber 11 whereafter the opening in the cabinet rear wall is closed and sealed. The sealed casing 20 is clamped to a lower part of portion 41 of the roll-forged member and is moved therewith toward cabinet 10 to locate the casing in a mounted position within the machine compartment 19. The second or lower elongated portion 41 of the roll-forged member has passages therein forming or providing a gaseous refrigerant return duct 42 which communicates through the connecting leg or web means 36 with an outlet end of the refrigerant expansion ducts 39 in walls of the freezing compartment and is provided with an outlet opening 43 drilled in one wall only of the member or in the enlarged circular end part 44 thereof (see Figures 5, 6 and 7). The fine line stop-weld material 24 provides the refrigerant restrictor passages 45 which communicates at its one end, through the web or leg connection 37, with an inlet end of the refrigerant expansion ducts 39 and accumulators 40 in walls of the freezing compartment. The other or opposite end of restrictor tube 45 communicates with a larger duct 46 opening into a liquid refrigerant receiving and storing chamber 47 within portion 41 and formed therein in a manner similar to forming the accumulators 40 and as fully described in the Wurtz et al. patent hereinbefore referred to. A tortuous passage 48, communicating with receiver 47, forms or provides a condenser or refrigerant condensing duct in the second portion 41 of the roll-forged member. The end of duct 48 is provided with an inlet opening 49 drilled in one wall only of the member or in an enlarged circular end part 51 thereof. A vertically extending looped passage within the second elongated portion 41 of the roll-forged member provides a refrigerant superheat removing coil or precooling duct 52 therein. Duct 52 is provided at its ends with a refrigerant inlet and a refrigerant outlet opening 53 and 54 respectively drilled in one wall only of the member or in circular enlargements 56 and 57 formed therein. The elongated second integral portion 41 of the roll-forged member has its vertical edges bent and flanged as at 58 (see Figures 2 and 3) and secured to the back wall of cabinet 10 to space a part thereof therefrom whereby a flue 59 is provided therebetween for the flow of air upwardly across and in contact with the condenser 48, receiver 47 and precooling coil 52. The integral two-portioned roll-forged member has all the essential conduits or ducts of a refrigerator system wholly contained therein and is adapted to be clamped against a juncture-like boss 61 provided on a side of the sealed casing 20 containing the motor-compressor part or unit of the system. It will be noted that the outlet end 44 of refrigerant return duct 42, inlet end 51 of condenser duct 48 and the inlet and outle ends 56 and 57 of the refrigerant precooling duct 52 all terminate in close proximity to one another inwardly of an edge of the roll-forged member (see Figure 6) so as to enable this part of portion 41 of the roll-forged member to be sealingly clamped to the juncture boss 61 on casing 20.

Figure 6:
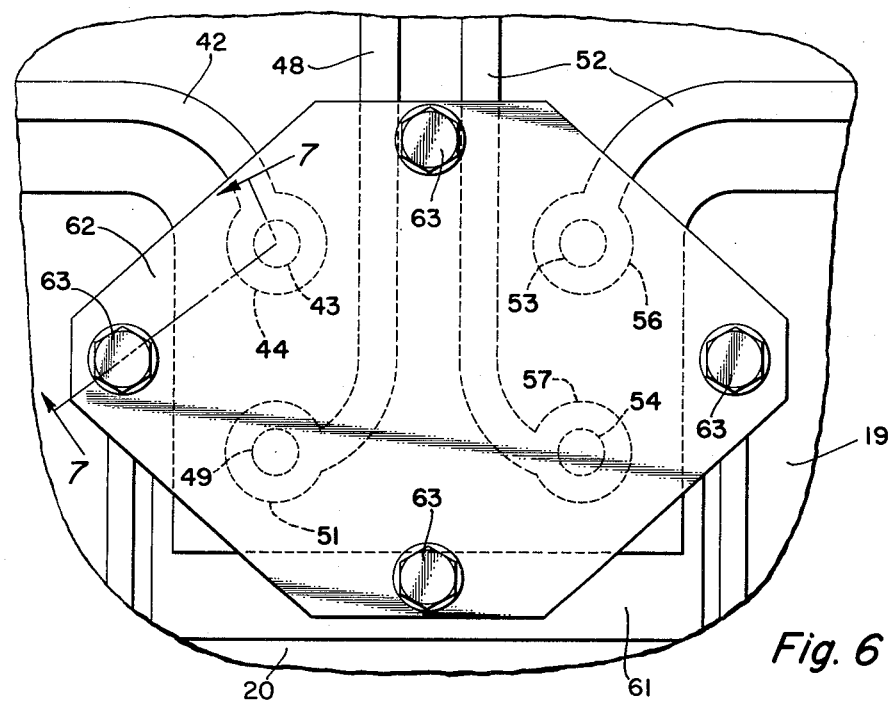
Figure 6 is a fragmentary enlarged view showing the clamping of a roll-forged member to a juncture-like boss on a casing having a motor-compressor unit sealed therein.
Figure 7:
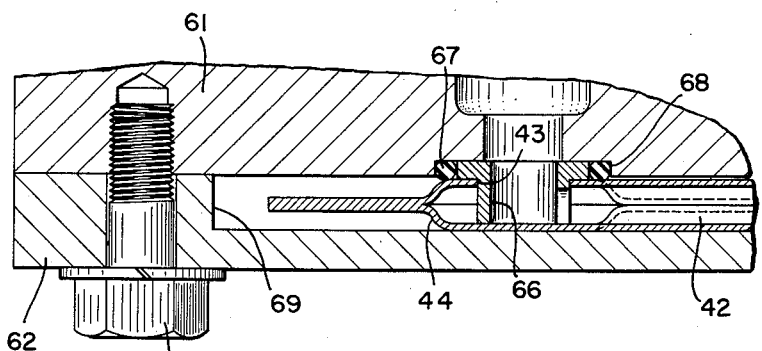
Figure 7 is a fragmentary sectional view taken on the line 7—7 on Figure 6 showing the mechanical seal of refrigerant passages in the roll-forged member to the motor-compressor casing.

In Figures 6 and 7 of the drawings we show a plate 62 lying over the roll-forged member at the point where the end 44 of duct 42, end 51 of duct 48 and ends 56 and 57 of duct 52 terminate. Plate 62 is clamped against the roll-forged member by bolts 63 threaded into boss 61 on casing 20. The boss 61 is provided with four port openings leading to various portions of the interior of casing 20. For example the sealed casing 20 may be provided with passageways and port openings to accommodate elements of a motor-compressor unit of the type shown in the Francis I. Rataiczak Patent 2,420,442 dated May 13, 1947. In this type of sealed motor-compressor unit the compressed refrigerant is first directed out of the casing 20 into the superheat removing or precooling duct 52 and is then returned to the interior upper portion of casing 20. The refrigerant is again directed out of casing 20 into the refrigerant condenser duct 48 where it is cooled and liquified and collects in receiver 47. Liquid refrigerant flows under the control of restrictor duct or passage 45, through leg or web 37 into the refrigerant expansion passages 39 wherein it absorbs heat and vaporizes. Vaporous or gaseous refrigerant leaving the refrigerant evaporating ducts 39 is conducted back into the casing 20 by way of return duct 42. Thus the open inlet end 53 of duct 52 is sealingly clamped to boss 61 in communication with a first outlet port leading directly to the discharge side of the compressor in casing 20. The open outlet end 54 of duct 52 is sealingly clamped to boss 61 to communicate with a first inlet port of casing 20 for returning precooled refrigerant from the heat removing duct 52 thereto. The open inlet end 49 of condenser duct 48 is sealingly clamped to boss 61 in communication with a second outlet port leading from the interior of casing 20 to convey refrigerant into the refrigerant condenser or duct 48. The open outlet end 43 of return duct 42 is sealingly clamped to a second inlet port in casing 20 leading directly to the compressor therein for conveying gaseous or evaporated refrigerant from ducts 39 in walls of the freezing compartment back into compressor. All four of these connections are substantially alike and each includes a slotted bushing 66 (see Figure 7) inserted into the roll-forged member through the opening at the end of the ducts. A rubber-like O-ring 67 is located between a shoulder of counterbore 68 in boss 61 and the one end portion of bushing 66. The O-ring 67 at each connection is adapted to be compressed between the boss 61 and the enlarged circular end parts 44, 51, 56 and 57 of ducts 42, 48 and 52 for sealing the connection of the ducts in the roll-forged member against the boss 61 of casing 20. Bushings 66 are each of such length that when stop or spacer legs 69 on the clamping plate 62 are forced into engagement with the boss 61, as shown in Figure 7, the O-rings 67 are sufficiently compressed to form a seal. By limiting movement of the clamping plate 62 toward boss 61 by their contacting one another, when clamped together, the bushings 66 are prevented from biting into or rupturing the one wall of the ducts opposite the wall thereof in which the round opening is drilled and yet the roll-forged member is rigidly clamped between boss 61 and plate 62 in such fashion that all of the O-rings 67 seal their respective connections.

Figure 12:
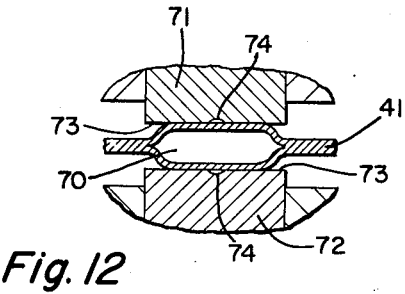
Figure 12 is a fragmentary sectional view showing dies adapted to reshape flat walls of a passage in a roll-forged member after the passage has been dilated.
Figure 13:
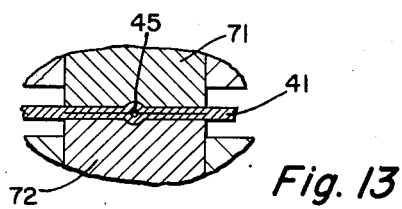
Figure 13 is a view similar to Figure 12 showing the dies brought together to convert the dilated passage into a restricted passage.

We prefer to form the restrictor passage or duct 45 in the roll-forged member during initial dilation thereof, while confining walls of this passage by the removable and interchangeable inserts 29 and 33 in blocks or plates 27 and 28, as shown in Figures 10 and 11 of the drawings. Other methods of providing restrictor passage 45 may however be employed. For example, a flat walled passage, similar to other flat side wall passages dilated in the roll-forged member, may be provided by continuously flat surfaced blocks or heavy plates devoid of the herein disclosed inserts 39 and 33, and in accordance with the disclosure in the Long patent. Walls of such a passage may be reformed or reshaped after the dilating operation to reduce the cross sectional area to that substantially equal to a capillary passage. In Figure 12 of the drawings we disclose a roll-forged member having a passage 70 dilated therein into a size and shape similar to the larger flat side walled passages in Figures 10 and 11 and show two grooved reshaping or reforming dies 71 and 72 adapted to be brought together under pressure along this passage after the dilating operation. The flat surfaces 73 and groove 74 in each die 71 and 72 reshapes the dilated walls of passage 70 when pressure is applied to the roll forged member (see Figure 13) to substantially close the passage or reshape the same into a capillary size or area as compared to other flat side walled passages therein. Even though portions of the plates of the roll-forged member immediately adjacent the capillary passage therein are not bonded together the cross sectional contour of this capillary passage is such that refrigerant pressures ordinarily encountered in a refrigerator system will not deform or bulge walls of the capillary passage. Walls of the passage 70 could be reshaped after dilation thereof at a plurality of spaced apart points along the length thereof to provide a series of restrictions therein to serve as a refrigerant restrictor.

Our incorporation of an evaporator, a condenser, a receiver, a restrictor and a refrigerant precooling coil in two integral portions of a roll-forged member and the clamping of one of the portions of this member directly to a sealed motor-compressor casing has provided a two part refrigerating system which eliminates the use of individual conduits or pipes ordinarily extending between separated elements of a refrigerating system. By making the blocks or plates, employed during the dilation operation, of such size as to accommodate therebetween the largest of a roll-forged member for big refrigerators and by virtue of employing the interchangeable inserts for the blocks these same blocks or plates can be used in the dilation operation of smaller sized roll forged members. In other words the interchangeable inserts provide means whereby a restrictor passage of any suitable or desirable predetermined length can be formed in various roll-forged members to accommodate the particular size of the member and capacity of a sealed motor-compressor unit to be connected thereto. When the confining fixture is to be altered to accommodate different sized roll-forged members all that is required to do is to change the inserts in the confining blocks or plates, provide a different inexpensive stencil and provide a centering means intermediate the blocks or plates to properly locate a member therebetween. Thus tooling costs to produce different sizes of the herein described two portioned element of a refrigerating system is reduced to minimum which reflects in the price of the finished product. Our invention furthermore provides a novel method of forming a refrigerant pressure reducing or restrictor passage of substantially capillary size between sheets or plates of a roll-forged member and this passage can be formed in either portion of the two integral portioned member or it can be formed as an independent element for refrigerating systems.

While the form of embodiment of the invention as herein disclosed constitutes a preferred form, it is to be understood that other forms might be adopted as may come within the scope of the claims which follow.

What is claimed is as follows:

1. A refrigerating apparatus including a cabinet having a food storage chamber therein and a refrigerating system associated therewith, said refrigerating system comprising a sealed casing containing a motor and a compressor driven thereby and a roll-forged member having a plurality of passages therein, said roll-forged member having a portion thereof bent to provide walls of a freezing compartment and being disposed in said food storage chamber with the passages in said walls forming refrigerant expansion ducts, said member having another integral elongated portion with passages therein, a part of said another portion of said member extending along the back wall of said cabinet and being spaced therefrom to form an air flue therebetween, the passages within said another portion of said roll-forged member providing refrigerant condensing, refrigerant return and refrigerant restricting ducts therein, said refrigerant return duct having an outlet and provided with an inlet communicating with a discharge end of the refrigerant expansion ducts in walls of said freezing compartment, said refrigerant restricting duct having an inlet communicating with an outlet end of said refrigerant condensing duct and an outlet communicating with an inlet end of said refrigerant expansion ducts in walls of said freezing compartment, said refrigerant condensing duct being provided with an inlet end, the inlet end of said refrigerant condensing duct and said outlet of said refrigerant return duct terminating in close proximity to one another inwardly of an edge of said another portion of said member, said casing having a refrigerant outlet port and a refrigerant inlet port, means clamping said another portion of said roll-forged member to said casing with said inlet end of said refrigerant condensing duct aligned with and connected to said outlet port and said outlet of said refrigerant return duct aligned with and connected to said inlet port, and said clamping means including means for sealing said connections to form a closed refrigerant circuit.

2. A refrigerating apparatus including a cabinet having a food storage chamber therein and a refrigerating system associated therewith, said refrigerating system comprising a sealed casing containing a motor and a compressor driven thereby and a roll-forged member having a plurality of passages therein, said roll-forged member having a portion thereof bent to provide walls of a freezing compartment and being disposed in said food storage chamber with the passages in said walls forming refrigerant expansion ducts, said member having another integral elongated portion with passages therein, a part of said another portion of said member extending along the back wall of said cabinet and being spaced therefrom to form an air flue therebetween, the passages within said another portion of said roll-forged member providing refrigerant condensing, and refrigerant return ducts therein, said refrigerant condensing duct having an inlet end and provided with an outlet communicating with an inlet end of said refrigerant expansion ducts in walls of said freezing compartment, said refrigerant return duct having an outlet end and provided with an inlet communicating with an outlet end of said refrigerant expansion ducts in walls of said freezing compartment, the inlet end of said refrigerant condensing duct and the outlet end of said refrigerant return duct terminating in close proximity to one another inwardly of an edge of said another portion of said member, said casing having a refrigerant outlet port and a refrigerant inlet port, means clamping said another portion of said roll-forged member to said casing with said inlet end of said refrigerant condensing duct aligned with and connected to said outlet port and said outlet end of said refrigerant return duct aligned with and connected to said inlet port, and said clamping means including means for sealing said connections to form a closed refrigerant circuit.

3. A refrigerant apparatus including a cabinet having a food storage chamber therein and a refrigerating system associated therewith, said refrigerating system comprising a sealed casing containing a motor and a compressor driven thereby and a roll-forged member having a plurality of passages therein, said roll-forged member having a portion thereof bent to provide walls of a freezing compartment and being disposed in said food storage chamber with the passages in said walls forming refrigerant expansion ducts, said member having another integral elongated portion with passages therein, a part of said another portion of said member extending along the back wall of said cabinet and being spaced therefrom to form an air flue therebetween, the passages within said another portion of said roll-forged member providing refrigerant condensing, refrigerant return and refrigerant precoooling ducts therein, said refrigerant condensing duct having an inlet end and provided with an outlet communicating with an inlet end of said refrigerant expansion ducts in walls of said freezing compartment, said refrigerant return duct having an outlet end and provided with an inlet communicating with an outlet end of said refrigerant expansion ducts in walls of said freezing compartment, said refrigerant precooling duct having an inlet end and an outlet end, said inlet end of said refrigerant condensing duct, said outlet end of said refrigerant return duct and said inlet and outlet ends of said refrigerant precooling duct all terminating in close proximity to one another inwardly of an edge of said another portion of said member, said casing having a first and a second refrigerant outlet ports and a first and a second inlet ports, means clamping said another portion of said roll-forged member to said casing with said inlet end of said refrigerant condensing duct aligned with and connected to said second outlet port, with said outlet end of said refrigerant return duct aligned with and connected to said second inlet port, with said inlet end of said refrigerant precooling duct aligned with and connected to said first outlet port and with said outlet end of said refrigerant precooling duct aligned with and connected to said first inlet port, and said clamping means including means for sealing said connections to form a closed refrigerant circuit.

4. A refrigerating apparatus including a cabinet having a food storage chamber therein and a refrigerating system associated therewith, said refrigerating system comprising a sealed casing containing a motor and a compressor driven thereby and a roll-forged member having a plurality of passages therein, said roll-forged member having a portion thereof bent to provide walls of a freezing compartment and being disposed in said food storage chamber with the passages in said walls forming refrigerant expansion ducts, said member having another integral elongated portion with passages therein, a part of said another portion of said member extending along the back wall of said cabinet and being spaced therefrom to form an air flue therebetween, the passages within said another portion of said roll-forged member providing refrigerant condensing, refrigerant return, refrigerant restricting and refrigerant precooling ducts therein, said refrigerant condensing duct having an inlet end and provided with an outlet, said refrigerant return duct having an outlet end and provided with an inlet communicating with an outlet end of said refrigerant expansion ducts in walls of said freezing compartment, said refrigerant restricting duct having an inlet communicating with said outlet of said refrigerant condensing duct and having an outlet communicating with an inlet end of said refrigerant expansion ducts in walls of said freezing compartment, said refrigerant precooling duct having an inlet end and an outlet end, said inlet end of said refrigerant condensing duct, said outlet end of said refrigerant return duct and said inlet and outlet ends of said refrigerant precooling duct all terminating in close proximity to one another inwardly of an edge of said another portion of said member, said casing having a first and a second refrigerant outlet ports and a first and a second inlet ports, means clamping said another portion of said roll forged member to said casing with said inlet end of said refrigerant condensing duct aligned with and connected to said second outlet port, with said outlet end of said refrigerant return duct aligned with and connected to said second inlet port, with said inlet end of said refrigerant precooling duct aligned with and connected to said first outlet port and with said outlet end of said refrigerant precooling duct aligned with and connected to said first inlet port, and said clamping means including means for sealing said connections to form a closed refrigerant circuit.

5. In a refrigerating system, a roll-forged member having a plurality of passages therein, said member including a first portion bent to provide walls of a freezing compartment with the passages in said walls forming refrigerant expansion ducts, said member also including a second integral elongated portion, some of the passages within said second portion of said member providing refrigerant condensing and refrigerant return ducts therein, another of said passages within said second portion of said roll-forged member being of capillary size relative to said ducts, one end of said refrigerant return duct having an outlet opening on one side only of said second portion of said member and having its other end communicating with a discharge end of the refrigerant expansion ducts in walls of said freezing compartment, one end of said capillary passage communicating with said refrigerant condensing duct and having its other end communicating with an inlet end of the refrigerant expansion ducts in walls of said freezing compartment for controlling flow of refrigerant thereto, said refrigerant condensing ducts having an inlet opening on said one side only of said second portion of said member, and said outlet opening of said refrigerant return duct and said inlet opening of said refrigerant condensing duct being disposed in close proximity to one another inwardly of an edge of said second portion of said roll-forged member and adapted to be sealingly clamped in communication with refrigerant inlet and outlet ports respectively of a compressor of a motor-compressor containing casing to form a closed refrigerant circuit.

6. A refrigerating apparatus including a cabinet having a food storage chamber therein and a refrigerating system associated therewith, said refrigerating system including a roll forged member having flat substantially parallel side walled passages formed therein, said member comprising a first portion bent to form walls of a freezing compartment and disposed in said chamber with the passages in said walls providing refrigerant expansion ducts, said member also comprising a second portion spaced from and connected to said first portion thereof by integral webs on said member, said second portion of said member extending along the back wall of said cabinet and having a part thereof spaced therefrom to provide an air flue therebetween, the flat side walls of said passages within each portion of said member being spaced an equidistance apart and the passages in said second portion providing a tortuous refrigerant condensing duct therein, said second portion of said member having an elongated refrigerant restrictor passage therein of substantially capillary size as compared to said flat walled passages, and one end of said restrictor passage communicating with said refrigerant condensing duct and having its other end portion extended through one of said integral webs and communicating with said refrigerant expansion ducts in said first portion of said roll forged member for controlling the flow of refrigerant from said condensing duct to said expansion ducts.

7. A refrigerating apparatus including a cabinet having a food storage chamber therein and a refrigerating system associated therewith, said refrigerating system including a one piece roll-forged plate member having passages formed therein, said member comprising a first portion disposed in said cabinet with the passages therein forming refrigerant expansion ducts to provide an evaporator in the system for cooling said chamber, said member also comprising a second portion spaced from and connected to said first portion thereof by integral web means on said member, said second portion of said member being located outside said cabinet and extending along its back wall with a part thereof spaced therefrom to provide an air flue therebetween, one of the passages within said second portion of said member providing a tortuous refrigerant condensing duct therein, and another passage within the flue forming second portion of said member providing an elongated refrigerant restrictor duct therein of substantially capillary size as compared to the cross-sectional area of said refrigerant condensing and expansion ducts, one end of said restrictor duct communicating with the refrigerant condensing duct in said second portion of said roll-forged member and having its other end portion extending through said web means and communicating with the refrigerant expansion ducts in said first portion of said member for controlling the flow of refrigerant from said condensing duct to said expansion ducts.

8. In a refrigerating system, a compressor, a one piece roll-forged plate member having a condenser duct in one portion thereof, an expansion duct in another portion of said member remote from said condenser duct and a restrictor duct, said condenser duct, said restrictor duct and said expansion duct being connected in series flow relationship in the order named with said compressor, said restrictor duct being relatively small in cross sectional area as compared to the other ducts and forming a single series flow passage in said plate member of continuous capillary size intermediate said condenser duct and said expansion duct, and said capillary passage constituting the sole means for controlling flow of refrigerant from the condenser duct in said one portion of said plate member to the expansion duct in said another portion thereof.

References Cited in the file of this patent
UNITED STATES PATENTS

| | | |
|---|---|---|
| 1,985,931 | Kucher | Jan. 1, 1935 |
| 2,135,875 | Morse | Nov. 8, 1938 |
| 2,231,162 | Hintze | Feb. 11, 1941 |
| 2,243,903 | Hintze | June 3, 1941 |
| 2,690,002 | Grenell | Sept. 28, 1954 |
| 2,712,736 | Wurtz et al. | July 12, 1955 |